A. C. LINDGREN.
WHEELED PLOW.
APPLICATION FILED MAR. 4, 1908.

1,006,107.

Patented Oct. 17, 1911.
6 SHEETS—SHEET 3.

Fig. 3.

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

WHEELED PLOW.

1,006,107.       Specification of Letters Patent.       Patented Oct. 17, 1911.

Application filed March 4, 1908. Serial No. 419,119.

*To all whom it may concern:*

Be it known that I, ALEXUS C. LINDGREN, of Moline, county of Rock Island, and State of Illinois, have invented a new and useful Improvement in Wheeled Plows, of which the following is a specification.

This invention relates to wheeled plows and consists of an improved construction of the frame and the means for supporting the beam therefrom to admit of the raising and lowering of the same.

The invention consists also of improved means for maintaining the level of the beam in its different adjusted positions.

The invention consists further of various other improvements which will be hereinafter described and claimed.

In the accompanying drawings.

Referring to the drawings:—The frame of my improved machine comprises a front member in the form of an arched axle 1, and a rear member in the form of two frame-bars 2 and 3 having their forward ends jointed to the arched axle in the manner to be presently described, and their rear ends bolted to the sides of a casting or block 4, in which the upper end of a caster wheel stem 5 is swiveled, the lower end of said stem being provided with caster wheels 6 to support the rear end of the frame. At its front the frame is supported by ground wheels 7 mounted on the horizontal stub ends 8 of the arched axle, which comprises the parallel members 9 and the arched portion 10.

11 represents a longitudinally extending plow beam carrying a double mold board plow 11ª, which beam extends centrally beneath the arched portion of the axle to which it is loosely suspended by means of bracket plates 12 bolted to opposite sides of the beam and having bearings 13 in their outer ends in which the arched portion 10 of the axle is loosely mounted in such manner that the beam may rock thereon, so that notwithstanding the varying angles to which the parts of the frame may be adjusted in raising and lowering the plow, the beam may be caused to always maintain a truly horizontal position in order to preserve the "level" of the plow. The control of the movements of the beam to thus preserve the "level" is effected by means of an arm 14 extending rigidly from the beam obliquely upward through a vertical slot 15 in the seat standard 16, which slot is surrounded by a vertically adjustable block 17 containing a vertical guiding slot for the arm, and by means of which said arm may be changed in position in a vertical direction in order to vary the "pitch" or inclination of the plow.

The pivotal connection of the front and rear members of the frame is formed in the following manner. Extending upwardly from the arched portion of the axle at opposite sides and bolted to the parallel limbs 9 of said axle are two arms 18 and 19, the arm 19 being formed with a circular bearing-opening in which is loosely mounted a hollow sleeve 20 projecting inwardly from a frame 21 bolted to the inner side of the frame bar 3 at its forward extremity. The other arm 18 is provided with a hollow sleeve 22 on which is loosely mounted the forward end of the other frame bar 2, the pivotal connection of the frame bars and the arched axle being thus on a transverse axis passing centrally through the openings in said sleeves, on which axis the two parts of the frame are adapted to fulcrum in the operation of raising and lowering the plow.

The raising and lowering of the plow is effected by means of a hand lever 23, pivoted at its lower end to the frame bar 3 and provided with a segment gear 24 meshing with a segment gear 25 formed on the axle arm 19, the said lever being further provided with a locking dog 26 adapted to interlock with a segment rack 27 on the frame 21, whereby the two members of the wheeled frame, adjusted by means of said lever, may be held in their adjusted positions. When the driver pulls the hand lever rearwardly toward him, the parallel limbs of the arched axle, which when the plow is in action extend forwardly and downwardly, will be thrown to the rear, and the ground wheels will be moved toward the plow, at the same time the rear portion of the frame, comprising the frame bars 2 and 3, will be drawn forward, and the plow beam suspended from the arched portion of the axle will be bodily raised, the horizontal relation of the beam to the jointed member of the frame being maintained and the "level" of the plow preserved by means of the guide arm 14, which when the plow beam is raised, slides upwardly through the guide block on the seat standard. When now the plow beam is to be lowered, the driver pushes forwardly on the hand lever, with the result that the ground wheels will be forced forward away from the plow, and the rear portion of the frame will be moved rearwardly and the plow will be lowered.

It will be noted that in the raising and lowering of the plow, the parts of the frame assume respectively a contracted or folded position, and a "spread out" condition, that is to say, when the hand lever is thrown rearwardly to elevate the plow, the two parts of the frame are drawn together, the included angle being decreased and the axial connection of the two parts of the frame being raised; and when the hand lever is thrown forwardly the two parts of the frame are spread out and the included angle increased and the axial connection lowered. This action I deem of great advantage, in that the machine is given a long and extended supporting base when in action, which is due to the increased distance between the two points of support represented by the ground wheels at the front and the caster wheels at the rear, consequently the machine will not be sensitive to lateral strains or movements, and will travel forward truly in the line of draft. Furthermore, by reason of the fact that in this position of the parts the tread of the ground wheels is considerably in advance of the plow, ample room is given at the sides of the plow for the furrow to be turned without coming into contact with the wheels. When now the plow is raised, the supporting base is greatly lessened in extent by reason of the fact that the ground wheels will move to the rear and will stand opposite the plow, the rear caster wheels at the same time being drawn forward, the result being that the leverage, by which the plow is turned by the animals pulling on the beam, is greatly increased, so that the machine is correspondingly more sensitive to side strains and may be readily turned by the animals at the end of the furrow.

In order that the driver may be assisted in the operation of raising the plow, lifting springs 28 are provided which act on the axle arms 18 and 19 in such manner that the springs have a constant tendency to draw the ground wheels rearwardly and thereby raise the beam. I prefer to employ for this purpose coiled springs, which are arranged horizontally and longitudinally of the frame with their forward ends connected to fingers 29 and 30, depending respectively from the arms 18 and 19, and which have their opposite ends connected to the frame at its rear extremity. By reason of the location of these springs above the plow, it has been found that when in action, the soil from the furrow, as it is turned, is apt to become clogged between the coils of the springs, and to prevent this, the springs are inclosed in tubular casings 32, which while not interfering with the functions of the springs, effectually protect the same and prevent the entrance of dirt between the coils. The raising of the plow is also greatly assisted by the draft of the team on the beam, which draft acting on the arched portion of the axle from which the beam is suspended, will tend to draw it forwardly and thereby assist in forcing the ground wheels rearwardly.

The caster wheel stem 5, before alluded to, is mounted in the rear end of the frame in such manner that when the plow is in action and traveling in a straight line, the caster wheel will be held locked and will follow truly in the line of draft, and will be automatically unlocked and be free to swivel when the plow is to be turned at the end of the furrow. To effect this action, the block 4 at the rear end of the frame is formed with a depending tubular extension 33 having a vertical opening to receive the caster wheel stem, which opening flares or is widest at its upper end so that the stem may rock or tip therein. The lower end of this tubular extension rests on a collar 34 fixed adjustably to the stem by means of a set-screw, while the stem at a point above the upper end of the tubular extension, is encircled by a head 35 fixed to the same by means of a set-screw and having one side flattened as at 36, to bear against a flattened lug 37 extending upwardly from the block 4, the relation of these parts being such that when the flattened surface of the head bears against said lug, the caster wheel will be straight in the line of draft and will travel straight forward, in which position it will be held by the engagement of the two flattened surfaces, their engagement being maintained by the weight of the machine and driver acting on the stem and causing it to incline forwardly in the tubular extension 33. When the plow is lowered and the parts of the frame are spread out, the caster wheel stem assumes a forward inclination and bears with greater force on the locking lug 37, so that it will be held more securely locked in position. When, however, the plow is raised and the parts of the frame are drawn toward each other, the stem will assume less of an upright position and will bear with less force against the locking lug, so that when the plow is turned at the end of the furrow, the flat coöperating surfaces will readily disengage and the caster wheel will be free to swivel in the frame and follow the latter as it is turned to take the next furrow.

The plow frame of the form described is peculiarly adapted for giving support to a seed discharging mechanism, and in the accompanying drawings the frame is shown as being equipped with such mechanism. The present invention, however, relates to and is confined to the form and construction of the frame itself and the manner of supporting the plow beam, the seeding mechanism and the means for rendering the same operative and inoperative being claimed in a divisional application filed by me on the 10th day of June, 1910, Serial No. 566,214, and forms no part of the present invention.

Figure 1:
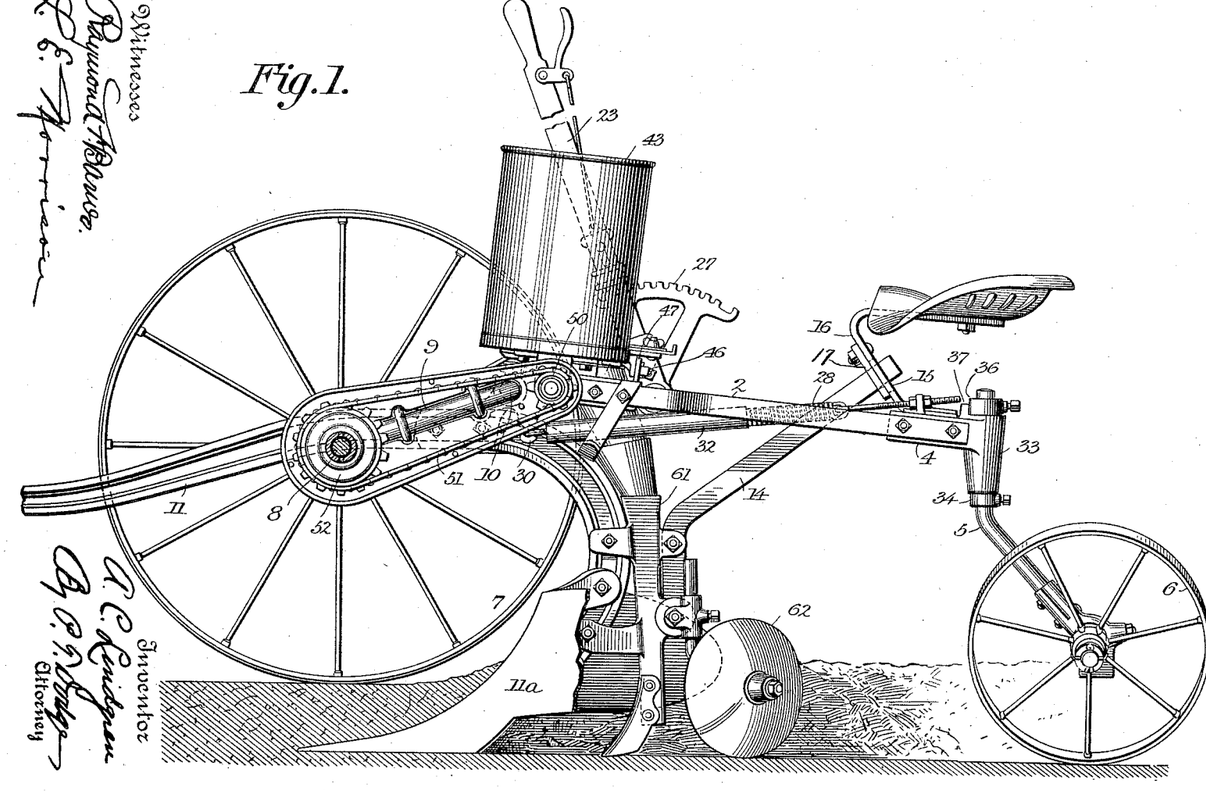
—Figure 1 is a side elevation of my improved machine with the plow in lowered position as in action.
Figure 2:
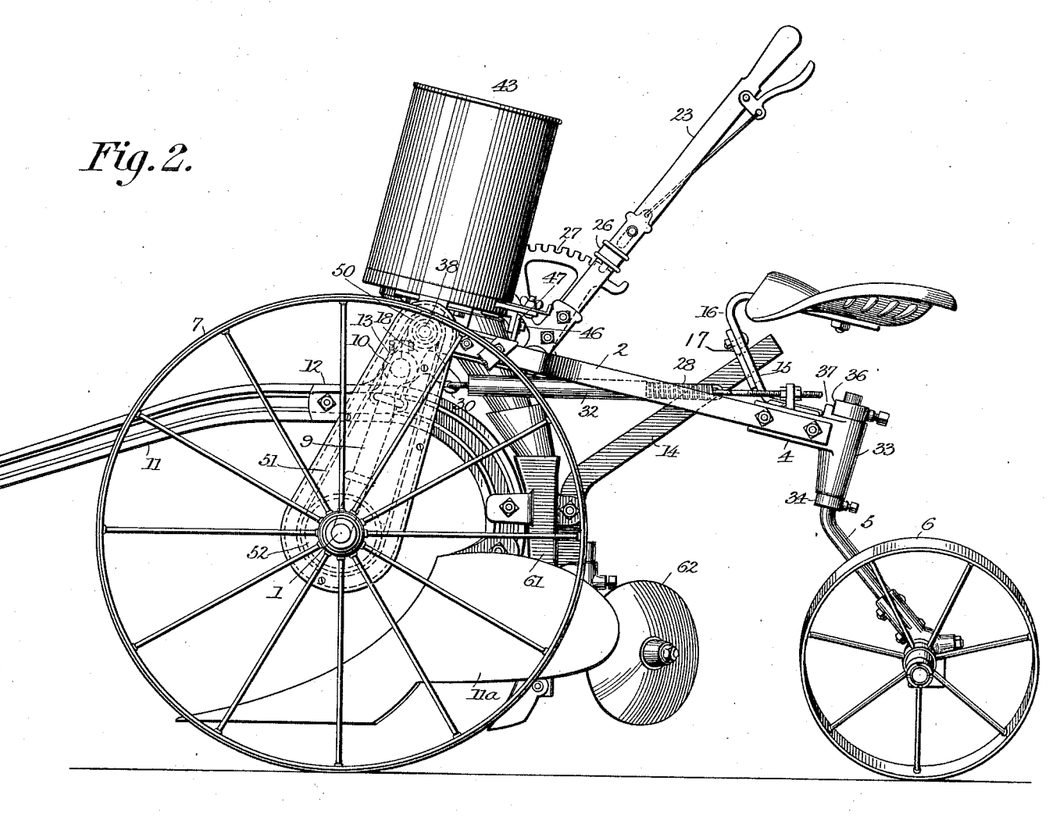
Fig. 2 is a similar view showing the plow raised.
Figure 3:
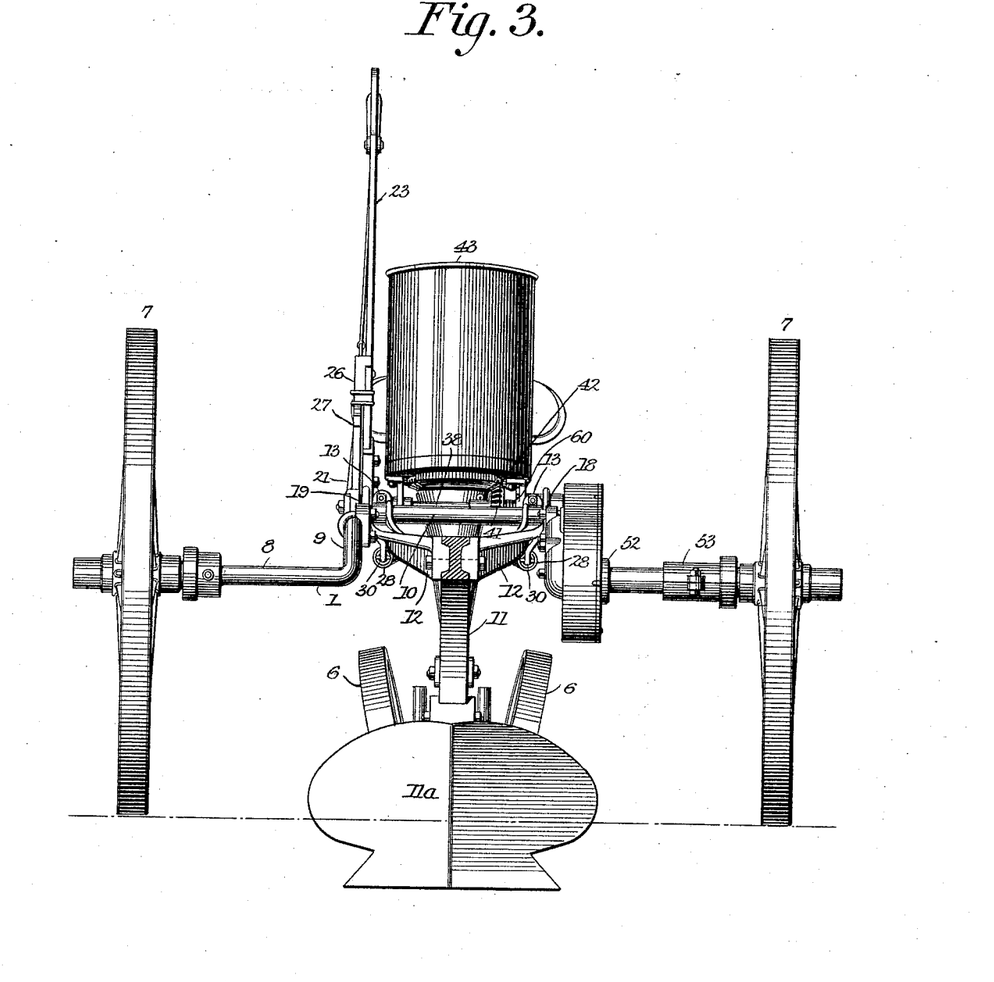
Fig. 3 is a front elevation of the machine.
Figure 4:
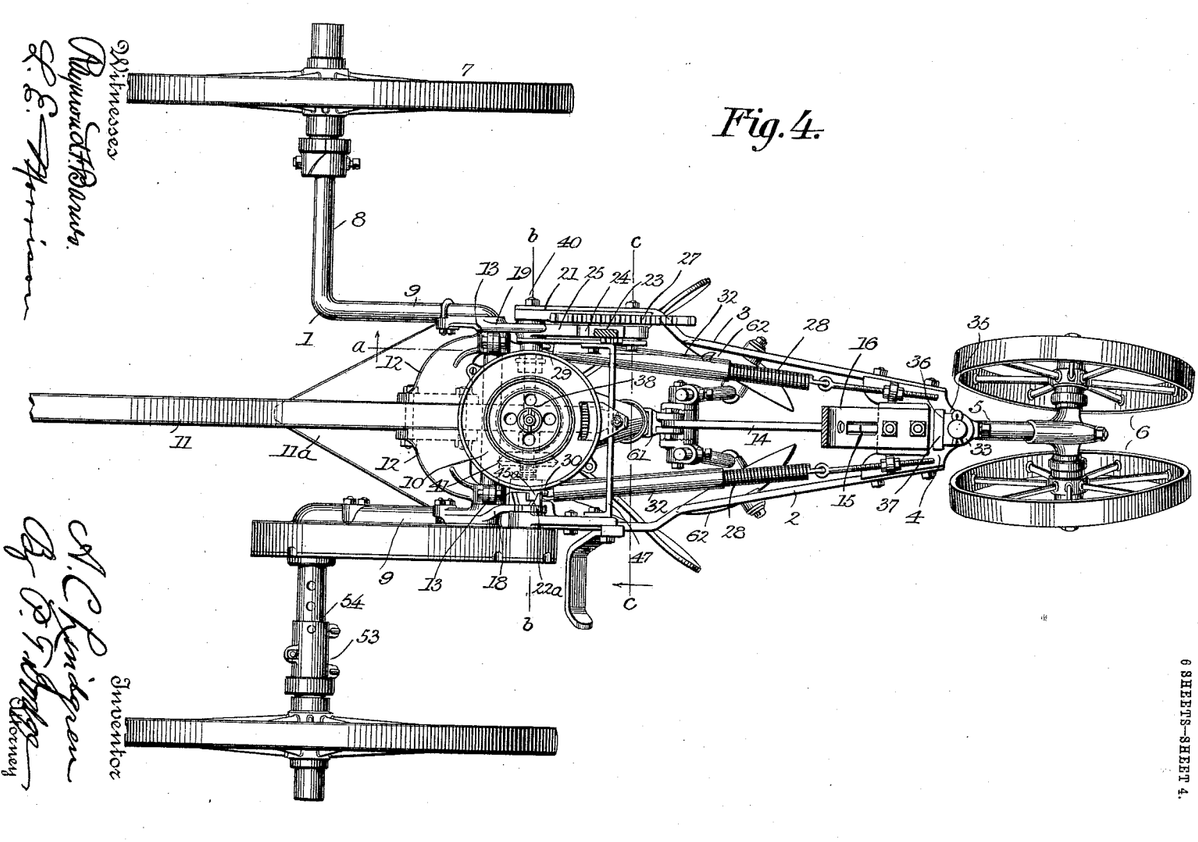
Fig. 4 is a top plan view with the seed hopper removed.
Figure 5:
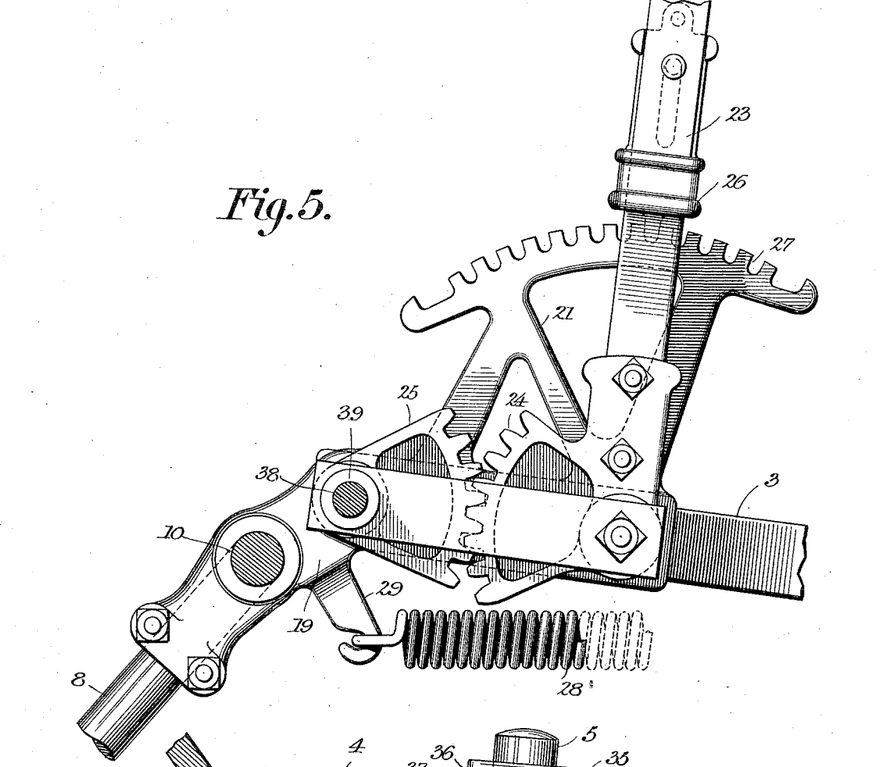
Fig. 5 is a longitudinal vertical section on the line $a$—$a$ of Fig. 4.
Figure 6:
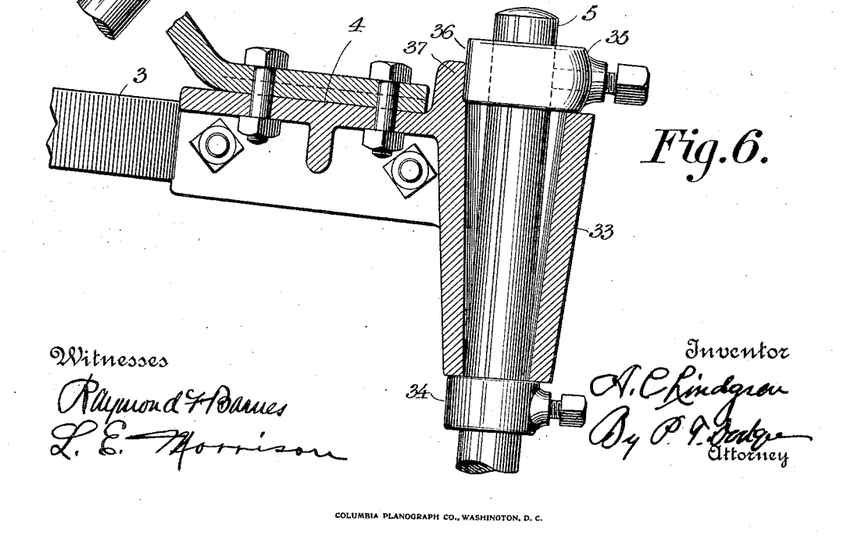
Fig. 6 is a longitudinal section through the rear portion of the frame, showing the bearing for the rear caster wheel stem, the said parts being on an enlarged scale.
Figure 7:
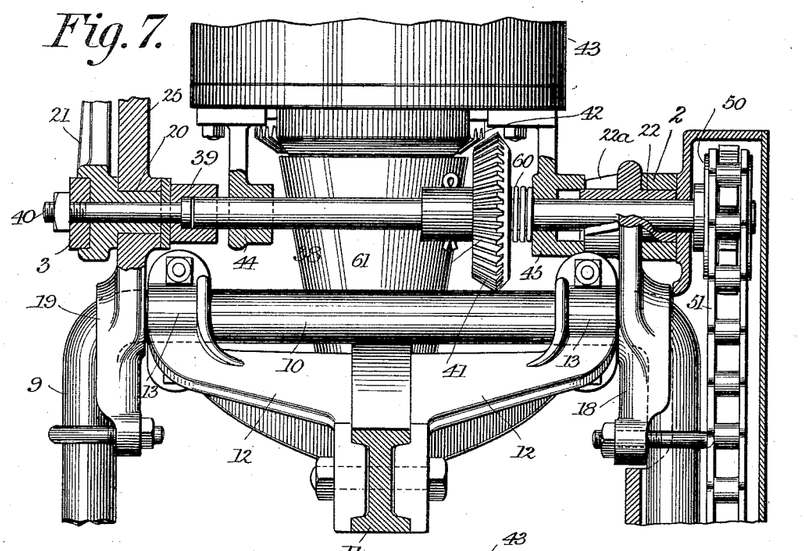
Fig. 7 is a transverse sectional elevation on the line $b$—$b$ of Fig. 4 taken longitudinally through the driving shaft for the seeding mechanism.
Figure 8:
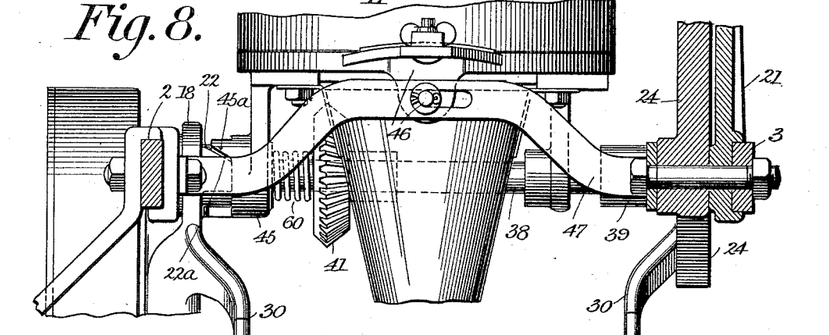
Fig. 8 is a transverse sectional elevation taken on the line $c$—$c$ of Fig. 4 as viewed in the direction of the arrows.
Figure 9:
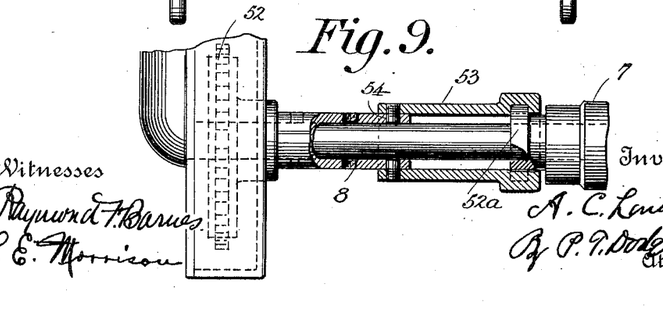
Fig. 9 is a sectional view through the stub end of the axle, on which the driving sprocket is mounted, showing the flexible dust-proof connection between the driving wheel and said sprocket.

The seed discharging mechanism is driven by means of a seed shaft 38, see Fig. 7, extending loosely through and having a bearing at one end within the sleeve 22 on the axle arm 18 and having a bearing at its opposite end in a bearing-block 39 on the inner end of a bolt 40 extending outwardly through the sleeve 20 and the frame bar 3, the outer end of the bolt having applied thereto a fastening nut. The shaft 38 has fixed to it a bevel pinion 41 meshing with and driving a bevel gear 42 mounted in the bottom of the seed hopper 43, and acting to operate the seed discharging mechanism therein. The seed hopper is provided at diametrically opposite sides with depending lugs 44 and 45 loosely encircling the seed shaft, whereby the hopper is movably sustained and may be shifted along said shaft, as will presently be described, in order to disengage the seed discharging mechanism from the pinion 41, the rear side of the hopper being sustained and guided in its sliding movements by means of a rearwardly extending finger 46 projecting through a horizontal guiding slot in a transversely extending bar 47, fixed at its opposite ends to the two frame bars.

That end of the seed shaft adjacent the bearing sleeve 22 is extended beyond said sleeve and has fixed to it a sprocket wheel 50 which is driven by means of a sprocket chain 51 from a sprocket wheel 52 on the horizontal stub end of the arched axle, which sprocket wheel is driven by the ground wheel through the medium of a coupling sleeve 53 interlocked at its opposite ends with the ground wheel and with the sprocket wheel respectively.

The coupling sleeve is for the purpose of preventing the rocking or loose motion of a badly fitting or worn ground-wheel from causing the driving sprocket to bind or run unevenly, the sleeve by being interlocked at its ends with the ground wheel and sprocket wheel, forming a loose or flexible driving connection between said parts. For the purpose of preventing the entrance of dust or dirt to the bearing surfaces of the wheels, the inner end of the hub of the ground wheel is formed with a peripheral flange $52^a$, which when the sleeve is in place, enters a corresponding groove in the latter, one of said parts being formed with a lug which enters a recess in the other and forms a driving connection by means of which the rotary motion of the ground wheel will be imparted to the sleeve. At its opposite end, the sleeve fits over the outer end of the hub of the sprocket wheel, which latter is formed with sockets receiving a lug 54 on the interior of the sleeve, by means of which a driving connection is formed between the sleeve and the sprocket wheel.

The shifting of the seed hopper along the shaft whereby the bevel gear is disengaged from the bevel pinion in order to render the seeding mechanism inoperative, is controlled and effected by the adjustment of the front and rear members of the frame to raise and lower the plow, means being provided whereby when the plow is raised, the seed hopper will be automatically moved along the shaft and the driving mechanism disengaged. This action is effected by forming on the supporting lug 45, a cam surface $45^a$ which is engaged by a cam surface $22^a$ on the side of the bearing sleeve 22, the relation and form of these parts being such that when the hand lever is thrown forwardly and the arched axle rocked to raise the plow the cam surface on the sleeve 22 will bear against that on the lug 45 and will forcibly slide the seed hopper along the seed shaft, thereby disengaging the bevel gear 42 from the driving bevel pinion 41, whereupon the action of the seeding mechanism will be arrested. When the plow is lowered, the cam surface on the sleeve 22 being moved away from the other cam surface, the seeding hopper is slid back to its former position by means of a spiral spring 60 encircling the said shaft between the bevel pinion 41 and the bearing lug 45, and the bevel gear 42 will be again engaged with the driving pinion.

The seed discharged by the seeding mechanism is directed into the upper end of a vertical tubular conductor 61, which is fixed to the plow beam and has applied to its lower end the subsoiler or furrow opener, from which conductor the seed enters the ground in the furrow formed thereby, covering disks 62 being applied to said conductor and acting to throw the soil inward and cover the seed in the furrow.

While in the accompanying drawings I have shown my invention embodied in a form which I prefer to adopt in practice, it will be understood that it may be embodied in various other forms without departing from the spirit thereof, and I desire it to be understood that my invention is not to be limited to any particular form or arrangement of parts except in so far as such limitations are specified in the claims.

Having thus described my invention, what I claim is:—

1. In combination with a supporting frame, comprising front and rear frame members jointed together on a transverse axis, the front member extending forwardly from said axis and the rear member extending rearwardly therefrom, suitable supports respectively for the front of the front frame member and rear of the rear frame member, means for adjusting said frame members to different angles, and a fore and aft extending plow beam loosely suspended from said frame on a horizontal axis in such manner that the members of the frame may move relatively to the beam in their different adjustments.

2. In combination with a supporting frame, comprising front and rear frame members jointed together on a horizontal transverse axis and extending forwardly and rearwardly therefrom, respectively, wheels supporting the ends of said frame members, means for adjusting the frame members to different angles, a fore and aft plow beam loosely suspended from the frame on a horizontal transverse axis, and in relation to which said frame members move in their different adjustments, and an operative connection between the beam and one of the frame members acting to automatically preserve the level of the plow in the different positions of the frame members.

3. In combination with a wheeled frame, comprising frame members jointed together on a horizontal transverse axis, a plow beam loosely suspended therefrom to rock on a horizontal transverse axis, means for adjusting said frame members to raise and lower the plow beam, and means for preserving a predetermined relation of the plow to the surface of the ground in the different adjustments of the frame members, said means being adjustable to change such relation.

4. In combination with a wheeled frame, comprising frame members jointed together on a horizontal transverse axis, a plow beam loosely suspended therefrom to rock on a horizontal transverse axis, means for adjusting said frame members to raise and lower the plow beam, and means for preserving a predetermined relation of the plow to the surface of the ground in the different adjustments of the frame members, said means being adjustable to change such relation and comprising an arm on the beam and a block on the frame coöperating with each other and adjustable one relatively to the other.

5. In combination with the forwardly extending arched axle, ground wheels supporting the same, arms extending upwardly above the arched portion of the axle, a rear frame-member jointed to said arms on a horizontal transverse axis, a caster wheel supporting the same, a plow beam loosely suspended from the arched portion of the axle on a horizontal transverse axis, and means for adjusting the arched axle and frame-member to different angles to raise and lower the plow.

6. The wheeled frame comprising front and rear frame-members jointed together on a horizontal transverse axis, means for adjusting said frame-members to different relative angles, a plow beam suspended from said wheeled frame and adapted to rock on a horizontal transverse axis, an arm on said beam, and a guiding slot in the frame through which the arm slides; whereby the level of the plow will be preserved as the frame-members are adjusted to raise and lower the plow.

7. In combination with the front frame-member formed with the horizontal elevated portion 10, ground wheels sustaining said member, a rear frame-member jointed to the front member on a horizontal transverse axis, a supporting wheel for the same, a seat standard rising from the rear frame-member and formed with a guiding opening, a plow beam hung loosely from the portion 10 of the front frame-member, and an arm extending rigidly from said beam and through the guiding opening in the seat standard.

8. In combination with the wheeled frame provided with a guiding opening, a fore and aft plow beam pivotally suspended loosely from the frame, means for raising and lowering the beam, and an arm on the beam extending freely through the guiding opening in the frame.

9. In combination with the wheeled frame comprising the front and rear frame-members jointed together on a horizontal transverse axis and extending respectively forwardly and rearwardly therefrom, means for adjusting said frame members to different relative angles around said axis, and a plow beam suspended loosely from the front member on a horizontal transverse axis at a point below the axis connecting the two frame members.

10. In combination with the arched axle disposed with its parallel limbs extending forwardly and downwardly, sustaining ground wheels mounted thereon, a rear frame-member jointed to said arched axle on a horizontal transverse axis and extending rearwardly, and a plow beam suspended loosely from the arched portion of the axle on a horizontal transverse axis and in relation to which beam the two frame members will move in their different adjustments.

11. In combination with the arched axle disposed with its parallel limbs extending forwardly and downwardly, ground wheels sustaining the same, arms on said axle extending above the arched portion thereof, a rear frame member jointed to said arms on a horizontal transverse axis, means for adjusting said arched axle and frame-member to different angles to raise and lower the plow, and a plow beam supported loosely by the arched portion of the axle on a horizontal transverse axis.

12. In combination with the arched axle and supporting ground wheels, an arm 19 fixed to said axle, a segment gear on the arm, said arm being provided with a bearing opening, an arm 18 fixed to the opposite side of the axle, a rear frame-member comprising two frame bars, a sleeve on one of said bars mounted in the bearing opening in the arm 19, a jointed connection between the other frame bar and the arm 18, a segmental gear journaled on the frame and engaging the first mentioned segmental gear, a lever connected with the pivoted gear on the frame, means for locking the lever in its adjusted positions, and a plow beam sustained by the frame.

13. In combination with the arched axle and supporting ground wheels, an arm 19 on said axle provided with a bearing opening and with a segmental gear, an arm 18 on the opposite side of the axle formed with a bearing sleeve, a rear frame-member comprising frame bars 2 and 3, an inwardly extending sleeve on the frame bar 3 mounted in the bearing opening in arm 19, a bearing opening in the frame bar 2 mounted on the bearing sleeve of arm 18, a segment gear 24 journaled on the frame bar 3 and meshing with that on the arm 19, a hand lever connected with the gear 24, whereby the parts of the frame may be adjusted to different relative angles and means for locking the hand lever in its adjusted positions.

14. In combination with the frame, comprising front and rear frame members jointed together on a horizontal transverse axis, of means for adjusting said members to different relative angles to raise and lower the plow, ground wheels sustaining the forward part of the same, a rear caster wheel for sustaining the rear part of the frame, a caster-wheel stem, a bearing on the frame in which said stem is mounted and by means of which the stem supports the rear end of the frame, said bearing being formed to permit the stem to both rock and turn therein, a bearing surface on the frame, and a coöperating bearing surface on the stem acting to hold the latter against turning movement and adapted to be disengaged by the rocking motion of the stem in the bearing.

15. In combination with the frame, comprising front and rear frame members jointed together on a horizontal transverse axis, of means for adjusting said members to different relative angles, ground wheels sustaining the forward portion of the same, a depending tubular extension on the rear end of the frame having its walls diverging upwardly, a rear caster wheel stem sustained at its lower end by a caster wheel and extending upwardly from the tubular extension and sustaining the rear end of the frame, a flat bearing surface on the stem, and a coöperating flat bearing surface on the frame acting to lock the stem against turning movement and adapted to be disengaged to permit the stem to rotate, when the latter is rocked in its bearing.

16. In combination with the frame comprising front and rear frame members jointed together on a horizontal transverse axis, of means for adjusting said members to different relative angles, front supporting wheels, a depending tubular extension on the rear end of the frame having an opening therethrough greatest in diameter at its upper end, a rear caster wheel stem connected at its lower end to a caster wheel and extending upwardly through the tubular extension and adapted to rock and swivel therein, a projection on the stem on which the lower end of the extension rests, a head on the upper end of the stem formed with a flat bearing surface, and a lug on the frame formed with a coöperating flat bearing surface; whereby the engagement of said flat surfaces will act to hold the stem against rotating movement, and whereby the rocking motion of the stem in its bearing will serve to disengage the bearing surfaces and permit the stem to turn.

17. In a lister plow, the combination of a wheeled frame comprising front and rear frame-members jointed together and extending respectively forwardly and rearwardly, a double moldboard plow sustained by said frame adjacent its joint, means for adjusting the frame-members to different angles to raise and lower the plow, horizontal longitudinally extending coiled lifting springs disposed above the plow on opposite sides of the beam, with their rear ends connected with the rear frame member and their forward ends connected with the front frame-member adjacent its jointed connection with the rear frame member; whereby said springs will tend to elevate the plow.

In testimony whereof I hereunto set my hand this first day of February, 1908, in the presence of two attesting witnesses.

ALEXUS C. LINDGREN.

Witnesses:
A. C. BARBER,
S. D. WADSWORTH.

Copies of this patent may be obtained for five cents each, by addressing the "Commissioner of Patents, Washington, D. C."